3,337,573
SUBSTITUTED 2-METHYL-BENZOXAZOLES AND 2-METHYL-BENZOTHIAZOLES
Brunello Mariani and Renato Sgarbi, Milan, Italy, assignors to Ferrania, S.p.A., Milan, Italy
No Drawing. Filed Oct. 14, 1965, Ser. No. 496,141
6 Claims. (Cl. 260—304)

The present invention relates to a process for preparing new compounds and a process for their use as intermediates for the synthesis of cyanine dyes which are photographic sensitizers.

It is known that in preparing cyanine dyes heterocyclic bases such as the benzoxazole and the benzothiazole can be employed. It is also known that the introduction of certain substitutes in the benzene ring of these bases can make the cyanine dyes derived therefrom especially useful for sensitizing photographic emulsions. One or more of these substitutes may be introduced in the 4, 5, 6 and 7 positions of the benzene ring.

One object of this invention is to provide new compounds from which cyanine dyes useful as photographic sensitizers can be prepared.

Another object of this invention is to provide cyanine dyes particularly useful as photographic sensitizers.

It has been found that substituted 2-methyl-benzothiazoles having the general formula

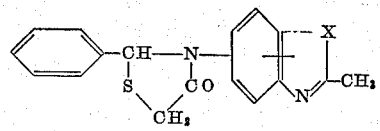

wherein X represents an oxygen or sulfur atom, wherein the phenyl radical may be substituted (e.g. chloro) or unsubstituted, submit easily to known processes of cyanine dyes synthesis and provide cyanine dyes of particular value as photographic sensitizers. These bases in fact can be salified, in a known way, with alkyl halides, dialkyl sulphates, alkyl p-toluene-sulfonates, aliphatic sultones, aliphatic alfahalogencarboxylic acids, etc. The quaternary salts thus obtained will submit to the usual condensations known in cyanine chemistry, such as the reactions with orthoesters; diaryl - formamidines; alkyl-mercapto- and halogenazoles of quinolines; acetanilidovinyl-, acetanilido - methylenbutadienyl- and hexatrienyl-derivatives of quaternary heterocyclic salts; acetyl, propionyl-, benzoyl-, triacetyl-, thiopropenyl-, thiobenzoyl- methylene benzo- or naphto-thiaboline and selenazolines.

(a) *Preparation of the 2 - methyl - 6-[2' - phenyl-4' -thiazolidonyl - 3'] - benzo - thiazole*

To 0.01 mole of 6 - amino - 2 - methyl - benzothiazole, in 80 ml. of anhydrous benzene was added 0.01 mole of benzaldehyde, and the mixture was boiled for 20 minutes. 0.02 mole of thioglycolic acid dissolved in 10 ml. of anhydrous benzene was then added, and the mixture refluxed for 30 hours. After having removed the solvent, the residue was treated with a sodium carbonate solution and allowed to stand for a few hours. After filtering and washing with water, the product was crystallized from methanol.
Melting point: 161° C.
Analysis.—Calculated N, 8.58%. Found: N; 8.73%.

(b) *Preparation of the 2-methyl-5-metoxy-6-[2'-phenyl-4'-thiazolidonyl-3']-benzo-thiazole*

It was prepared in a way similar to the preceding compound (a), starting from the 2 - methyl - 5 - metoxy - 6- amino-benzothiazole.
Melting point: 175° C.

Analysis.—Calculated N; 7.87%. Found: N; 7.87%.

(c) *Preparation of the 2-methyl-5-[2'-phenyl-4'-thiazolidonyl-3']-benzoxazole*

It was prepared in a way similar to the compound (a), starting from the 2 - methyl - 5 - amino - benzoxazole.
Melting point: 142° C.
Analysis.—Calculated N; 9.04%. Found: N; 9.11%.

(d) *Preparation of the 2-methyl-5-[2'-(2''-chloro)- phenyl-4'-thiazolidonyl-3']-benzothiazole*

It was prepared in a way similar to the compound (a), starting from the 2-methyl-5-amino-benzothiazole and 2-chloro-benzaldehyde.
Melting point: 179° C.
Analysis.—Calculated N; 7.78. Found: N; 7.80%.

(e) *Preparation of the 2-methyl-6-[2'-(2''-chloro)- phenyl-4'-thiazolidonyl-3']-benzothiazole*

It was prepared in a way similar to the compound (a), starting from the 2-methyl-6-amino-benzothiazole and 2-chloro-benzaldehyde.
Melting point: 130° C.
Analysis.—Calculated N; 7.78%. Found: N; 7.93%.

The following examples are illustrative of the preparation of cyanine dyes.

EXAMPLE 1

The dye of the structure:

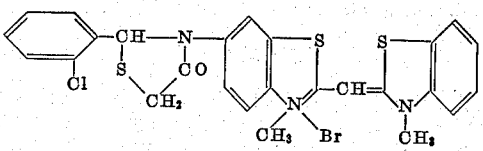

was prepared by reacting 2 - methyl - 6 - [2' - (2''-chloro) - phenyl - 4' - thiazolidonyl - 3'] - benzothiazole with a slight excess of dimethylsulfate for 40 minutes at 65° C. and by boiling in pyridine with 2 - methyl - mercapto - benzothiazole dimethylsulfate followed by subsequent treatment with aqueous potassium bromide and crystallization from methanol.
Maximum light absorption in ethanol: 4300 A.

EXAMPLE 2

The quaternary salt prepared as in Example 1, and 5-acetanilidomethylen - 3 - ethyl - rhodanine, in equimolecular quantities, were dissolved by boiling in ethanol. The resulting solution, to which triethylenamine was added, was heated in a water bath for 10 minutes. The precipitated dye was filtered and crystallized from ethanol-dioxane (1:1 ratio).
Melting point: 263° C. Maximum absorption in ethanol: 5230 A.
Structure:

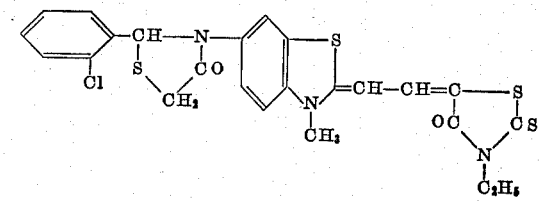

EXAMPLE 3

The quaternary salt prepared as in Example 1, was refluxed for one hour in pyridine with a 100% excess of ethyl-ortho-propionate. At the end of the reaction the reaction mass was poured into a large excess of aqueous potassium bromide. The dye thus precipitated was filtered, washed with water and with ether and then crystallized from methanol.

Maximum absorption in ethanol: 5630 A.
Structure:

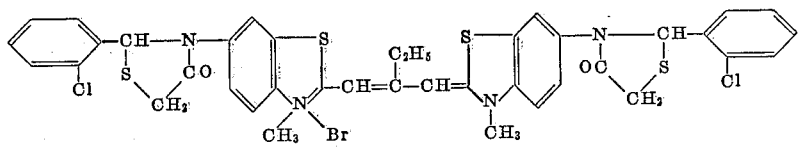

EXAMPLE 4

The dye having the formula:

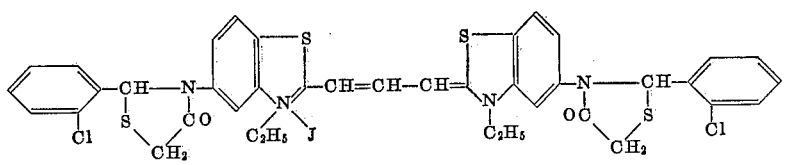

was prepared from the 2 - methyl - 5 - [2' - (2" - chloro)-phenyl - 4' - thiazolidonyl - 3'] - benzothiazole by salification with diethyl - sulfate at 65° C., boiling with ethyl ortho-formate in pyridine, treatment with aqueous potassium iodide and crystallizing from methanol.

Maximum absorption in ethanol: 5650 A.

EXAMPLE 5

Equimolecular quantities of 2-methyl-5-[2'-phenyl-4'-thiazolidonyl - 3'] - benzoxazole diethylsulfate (prepared from the corresponding base and from a slight excess of neutral diethylsulfate by heating for 40 minutes at 65° C.) and of 2 - ethyl - mercaptoquinoline iodoethylate were heated to reflux for 30 minutes in pyridine. Pouring the reaction mass into an excess of aqueous potassium iodide precipitated the dye which was filtered, washed with water and with ether, and crystallized from methanol.

Maximum absorption in ethanol: from 4380 to 4520 A.
Structure:

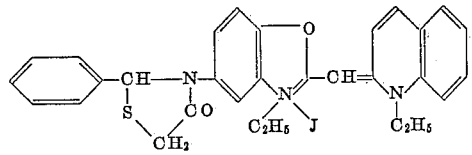

EXAMPLE 6

2 - methyl - 5 - [2' - (2" - chloro) - phenyl - 4' - thiazolidonyl - 3'] - benzoxazole was salified with a slight excess of diethyl-sulfate for 40 minutes at 65° C. The resulting quaternary salt, washed with ether, was condensed with ethyl orthoformate in pyridine by boiling for one hour. Treating the reaction mass with aqueous potassium iodide precipitated the dye, which was filtered, washed with water and with ether, and crystallized from methanol.

Maximum absorption in ethanol: 4940 A.
Structure:

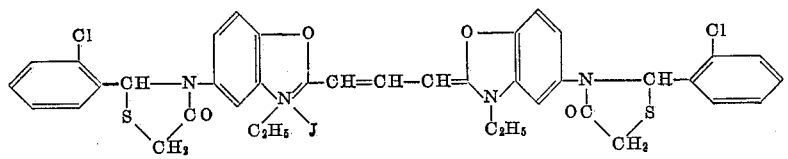

EXAMPLE 7

The dye having the formula

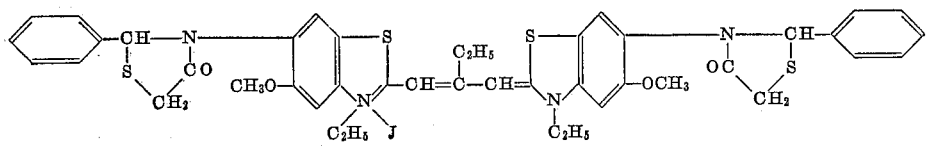

was prepared from 2 - methyl - 6 - [2' - phenyl - 4' - thiazolidonyl - 3'] - benzothiazole by salification at 65° C. with diethylsulfate, reaction with ethyl orthopropionate in pyridine, treatment with aqueous potassium iodide and crystallization from methanol.

Maximum absorption in ethanol: 5720 A.

EXAMPLE 8

The dye having the formula

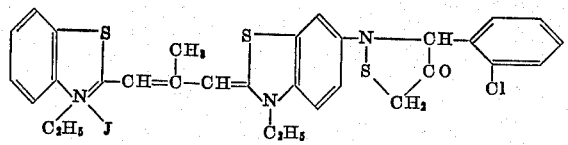

was prepared with a process similar to the method described in the Italian Patent No. 311,942.

Maximum absorption in ethanol: 5450 A.

EXAMPLE 9

The 2 - methyl - 6 - [2' - (2" - chloro) - phenyl - 4'- thiazolidonyl - 3'] - benzothiazole was salified by heating for 40 minutes at 65° C. with neutral diethylsulfate in a 10% excess. The quaternary salt thus obtained was washed with ether, an equimolecular quantity of the glutaconic aldehyde dianilide hydrochloride was added thereto, and the mixture was refluxed with absolute ethanol in a quantity sufficient to obtain a complete solution. To this solution, cooled to room temperature, was added triethylenamine. The mixture was stirred overnight. The dye precipitated during the reaction was filtered, washed with ethanol and ether (1:1 ratio) and the product was crystallized from anhydrous methanol.

Maximum absorption in ethanol: 7770 A.

By using the procedures of this invention it is possible to obtain cyanine dyes which have their maximum absorption in almost any portion of the visible light spectrum. Although they are particularly suitable for the optical sensitization of photographic emulsions containing silver halide and a natural or synthetic colloid, these cyanine dyes are also useful for dyeing natural and artificial fibers and plastic materials, as colorants for inks, etc. Photographic emulsions containing such sensitizers may also incorporate many other compounds serving special purposes, e.g. other chemical sensitizers, supersensitizers, anti-fogging agents, surface active agents, copulants, etc.

The embodiments of the invention in which an exclusive property or privilege is claimed are defined as follows:

1. A compound of the formula

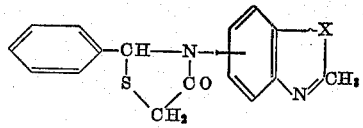

wherein X is oxygen or sulfur.

2. 2 - methyl - 6 - [2' - phenyl - 4' - thiazolidonyl - 3']- benzothiazole.

3. 2 - methyl - 5 - methoxy - 6 - [2' - phenyl - 4' - thiazolidonyl - 3'] - benzothiazole.

4. 2 - methyl - 5 - [2' - phenyl - 4' - thiazolidonyl - 3']- benzoxazole.

5. 2 - methyl - 5 - [2' - (2" - chloro)phenyl - 4' - thiazolidonyl - 3'] - benzothiazole.

6. 2 - methyl - 6 - [2' - (2" - chloro)phenyl - 4' - thiazolidonyl - 3'] - benzothiazole.

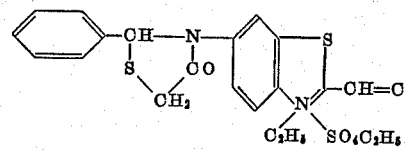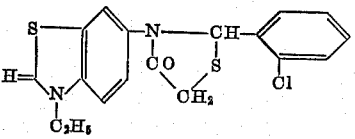

No references cited.

ALEX MAZEL, *Primary Examiner.*

R. J. GALLAGHER, *Assistant Examiner.*